(12) United States Patent
Sato

(10) Patent No.: US 7,947,792 B2
(45) Date of Patent: May 24, 2011

(54) PRODUCTION METHOD OF OPTICAL TRANSMISSION MEDIUM

(75) Inventor: Masataka Sato, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 73 days.

(21) Appl. No.: 12/160,127

(22) PCT Filed: Jan. 23, 2007

(86) PCT No.: PCT/JP2007/051327
§ 371 (c)(1),
(2), (4) Date: Jul. 7, 2008

(87) PCT Pub. No.: WO2007/086535
PCT Pub. Date: Aug. 2, 2007

(65) Prior Publication Data
US 2009/0069514 A1    Mar. 12, 2009

(30) Foreign Application Priority Data
Jan. 26, 2006   (JP) ................. 2006-018070

(51) Int. Cl.
    *C08F 12/20*     (2006.01)
    *C08F 18/20*     (2006.01)
    *C08F 18/00*     (2006.01)
    *C08F 22/00*     (2006.01)
    *C08F 34/00*     (2006.01)
(52) U.S. Cl. ............ 526/245; 526/242; 526/292.1; 526/292.95; 526/295
(58) Field of Classification Search .......... 526/64, 526/291, 292.1, 292.95, 328, 329.7; 385/143, 385/145
See application file for complete search history.

(56) References Cited

U.S. PATENT DOCUMENTS

| | | | | |
|---|---|---|---|---|
| 5,473,720 A | * | 12/1995 | Ali et al. | 385/128 |
| 2004/0024157 A1 | * | 2/2004 | Okazaki et al. | 526/319 |
| 2006/0173148 A1 | | 8/2006 | Sasaki et al. | |

FOREIGN PATENT DOCUMENTS

| | | | | |
|---|---|---|---|---|
| JP | 61170705 A | * | 8/1986 | |
| JP | 06-297596 A | | 10/1994 | |
| JP | 10-239534 A | | 9/1998 | |
| JP | 10239534 A | * | 9/1998 | |
| JP | 11006922 A | * | 1/1999 | |
| JP | 2003-321514 A | | 11/2003 | |
| JP | 2004-099652 A | | 4/2004 | |

OTHER PUBLICATIONS

Translation of JP10239534.*
English abstract of Otsuka et al.*

* cited by examiner

*Primary Examiner* — David Wu
*Assistant Examiner* — Elizabeth Eng
(74) *Attorney, Agent, or Firm* — Sughrue Mion, PLLC

(57) ABSTRACT

A polymerization initiator, a first polymerizable compound, and a second polymerizable compound are poured into a hollow of a first member (12). The first and second polymerizable compounds are copolymerized to produce a second member (16). The second member (16) is produced by forming a first layer (21) on an inner wall of the first member (12) and sequentially forming a layer over a precedingly formed layer. To form each layer, the first and second polymerizable compounds are put in the hollow of the first member (12), satisfying $1/99 \leq W2/(W1+W2) \leq 2/3$ when W1 is a weight of the first polymerizable compound, and W2 is a weight of the second polymerizable compound. The first and second polymerizable compounds are mixed such that the value of $W2/(W1+W2)$ increases from the first layer (21) toward an nth layer.

3 Claims, 4 Drawing Sheets

PRODUCTION METHOD OF OPTICAL TRANSMISSION MEDIUM

TECHNICAL FIELD

The present invention relates to a production method of an optical transmission medium. More particularly, the present invention relates to the optical transmission medium used as a plastic optical fiber and the like.

BACKGROUND ART

An optical transmission medium such as a plastic optical fiber has an outer shell and an optical transmission section of different reflective indices. The optical transmission medium transmits optical signals by reflecting incident light at interfaces between the outer shell and the optical transmission section.

Various suggestions have been made to produce the optical transmission medium having significantly reduced transmission loss. For instance, U.S. Patent Application Publication No. 2006/0173148 (corresponding to Japanese Patent Laid-Open Publication No. 2004-099652) suggests producing an optical member from a polymer composition in which two or more polymerizable compounds represented by certain general formulae are copolymerized in a certain mole ratio. The produced optical member has a very low transmission loss, and also prevents increase of the transmission loss caused by moist heat. Copolymers have an advantage in controlling the properties to be exhibited, for instance, optical properties such as a refractive index and the like, and thermal properties such as a glass transition temperature (Tg) compared to homopolymers which exhibit predetermined properties.

When a low molecular compound which does not contain a polymerizable component, that is, a non-polymerizable compound is added to the polymer to impart certain optical properties thereto, the non-polymerizable compound may affect other optical properties by diffusion or volatilization in the optical member. However, the copolymer exhibits such optical properties with a reduced amount of the non-polymerizable compound, or even without adding the non-polymerizable compound.

Japanese Patent Laid-Open Publication No. 06-297596 suggests an optical fiber constituted of a polymer mixture which contains a certain compound as a major component. In this optical fiber, a ratio of a structural unit is gradually changed in a diameter direction of a cross-section circle of the optical fiber. The above reference states that this optical fiber reduces the influence of infrared ray absorption caused by vibrations of C—H bonds, and initial properties of the optical fiber are not impaired with time.

However, in the case the optical transmission medium is produced from the composition disclosed in the above U.S. Patent Application Publication No. 2006/0173148, a loss of the light to be transmitted is caused by scattering of the light in the copolymer, which is hereinafter referred to as a scattering loss. The optical fiber of the Japanese Patent Laid-Open Publication No. 06-297596 reduces the transmission loss, and prevents the increase of the transmission loss caused by the moist heat. However, since the structure of this optical fiber has alkyl groups in a side chain, Tg of the optical fiber is low. As a result, under high temperature conditions, the transmission loss is increased, and a physical resistance is reduced to cause deformation. Accordingly, the optical fiber does not have sufficient practical utility.

An object of the present invention is to produce an optical transmission medium from a copolymer which resists high temperature and reduces the scattering loss.

DISCLOSURE OF INVENTION

In order to achieve the above and other objects, a production method of an optical transmission medium comprising the steps of: (A) putting a polymerization initiator, a first polymerizable compound represented by a general formula shown in a chemical formula 1, and a second polymerizable compound represented by a general formula shown in a chemical formula 2 in a tubular container, and the second polymerizable compound is capable of generating a homopolymer having higher refractive index than a homopolymer generated from the first polymerizable compound, and a weight W1 of the first polymerizable compound and a weight W2 of the second polymerizable compound satisfy $1/99 \leq \{W2/(W1+W2)\} \leq 2/3$; (B) copolymerizing the first and second polymerizable compounds in the tubular container while the tubular container is rotated around a center of a cross-section circle vertically intersecting a lengthwise direction of the tubular container; and (C) alternately repeating the steps (A) and (B) for plural times for concentrically forming plural layers from an inner wall of the tubular container toward the center of the cross-section circle, and a value of W2/(W1+W2) in the step (A) for Ith time (I: natural number) is different from a value of W2/(W1+W2) in the step (A) for (I+1)th time.

[Chemical formula 1]

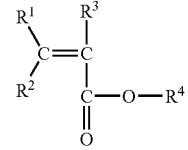

(In a general formula in the chemical formula 1, each of $R^1$ and $R^2$ is H or D, $R^3$ is H, D, $CH_3$, $CD_3$ or a halogen atom, $R^4$ is an alkyl group having 2 to 8 carbon atoms, and a fluorine atom substitutes for H in the alkyl group.)

[Chemical formula 2]

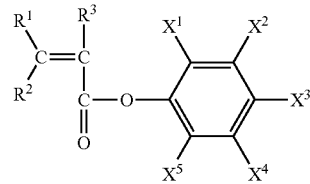

(In a general formula in the chemical formula 2, each of $R^1$ and $R^2$ is H or D, $R^3$ is H, D, $CH_3$, $CD_3$, or a halogen atom, each of $X^1$ to $X^5$ is H, D, a halogen atom, or $CF_3$, and at least one of $X^1$ to $X^5$ is a halogen atom or $CF_3$.)

Further, it is preferable that the value of W2/(W1+W2) in the step (A) for (I+1)th time is larger than the value of W2/(W1+W2) in the step (A) for Ith time.

The present invention also includes a plastic optical fiber produced by drawing the optical transmission medium obtained by the above described production method.

Thus, the optical transmission medium which resists high temperature and reduces a scattering loss is produced.

BEST MODE FOR CARRYING OUT THE INVENTION

The preferable embodiments of the present invention are hereinafter described in detail, but these embodiments do not limit the scope of the present invention.

Figure 1:
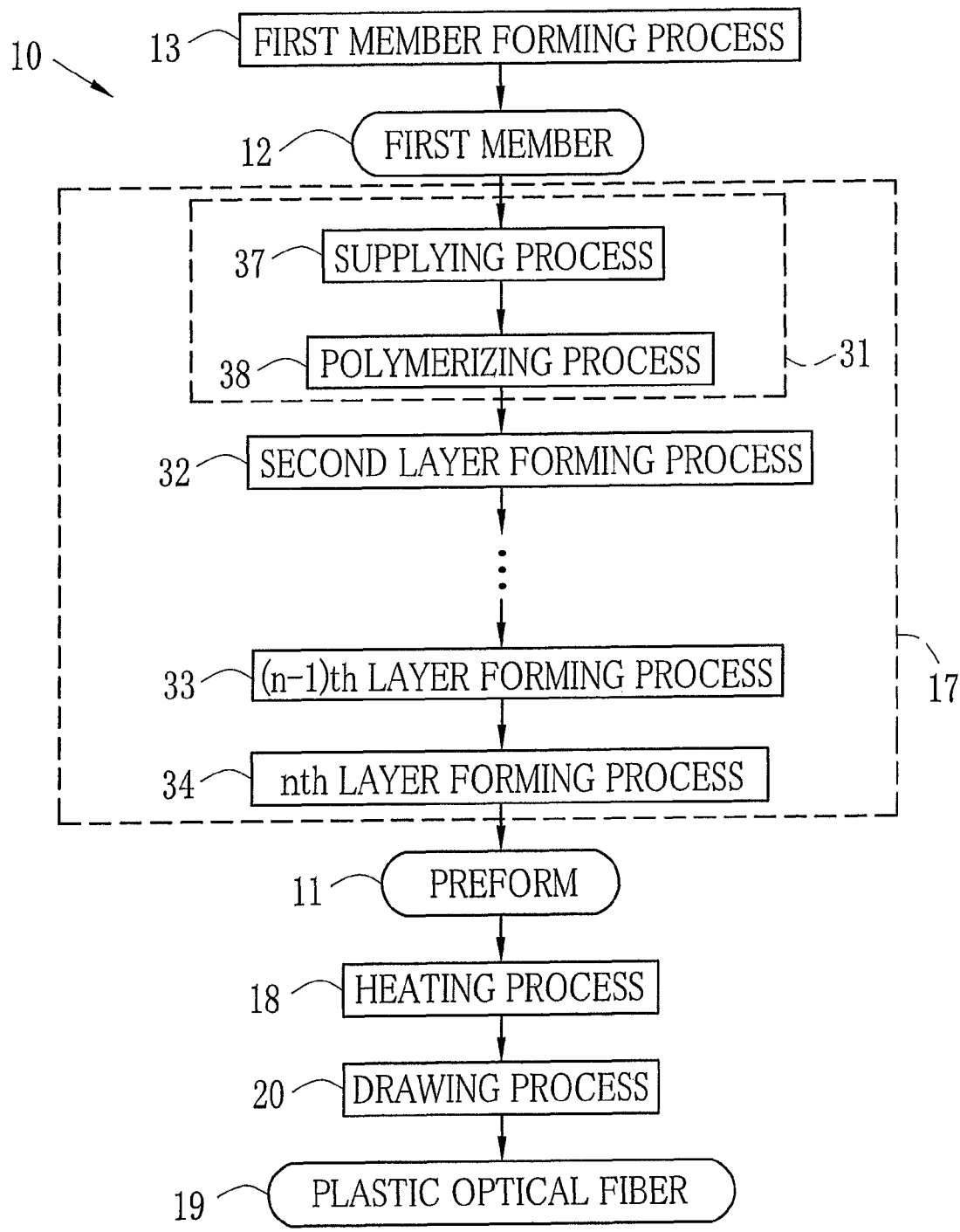
FIG. 1 is a POF production process of the present invention.

In FIG. 1, a POF production process 10 includes a first member forming process 13, a second member forming process 17, a heating process 18, and a drawing process 20. In the first member forming process 13, a tubular first member 12 which is an outer shell of a preform 11 is formed. In the second member forming process 17, a second member 16 which transmits light is formed in a hollow of the first member 12 to fabricate the preform 11. In the heating process 18, the preform 11 is heated. In the drawing process 20, the preform 11 is drawn in the lengthwise direction to produce a plastic optical fiber 19.

The second member 16 is formed by sequentially forming plural layers from the outer side toward the inside. The second member 16 has a concentric n-layer structure (n: a natural number) in a cross-section circle perpendicular to the lengthwise direction. The second member 16 has a first layer 21, a second layer 22, . . . , (n−1)th layer, and nth layer from the outer side toward the inside in this order. The first layer 21 is formed in a first layer forming process 31. The second layer 22 is formed in a second layer forming process 32. The (n−1)th layer is formed in a (n−1)th layer forming process 33, and the nth layer is formed in the nth layer forming process 34.

Figure 2:
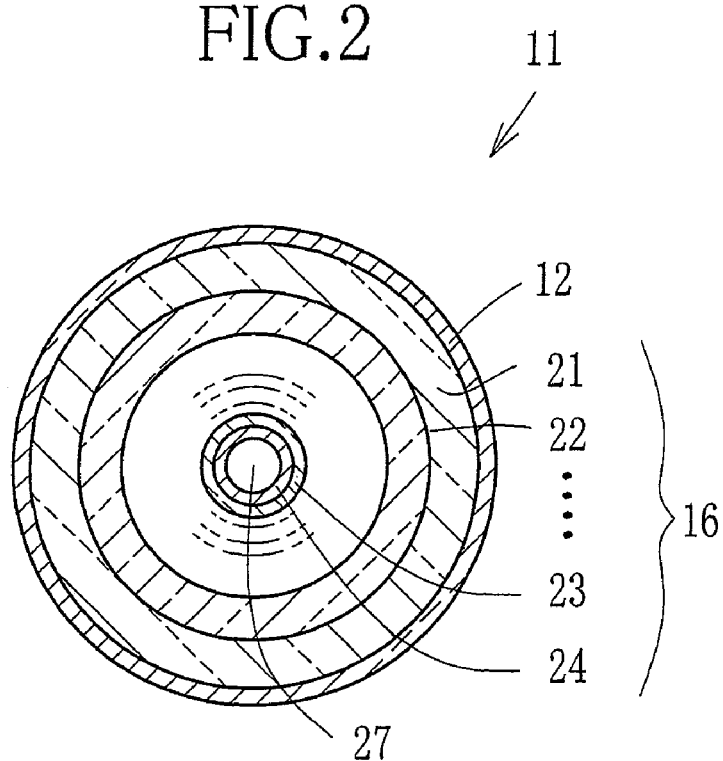
FIG. 2 is a cross-section of a preform.

Thickness of each of the layers 21 to 24 is uniform in the lengthwise direction. Each layer may have the same or different thickness. A hollow 27 may or may not be formed in a center portion of a cross-section circle of the preform 11, depending on conditions in forming the nth layer 24. In FIG. 2, a boundary between the first member 12 and the second member 16, and boundaries between the first to nth layer 21 to 24 are illustrated only for the sake of convenience. Visibility of each of the boundaries differs depending on producing conditions. In fact, the boundaries are not necessarily visible. In view of optical transmission, it is preferable that the optical boundaries do not exist.

In this embodiment, a production method to fabricate the preform 11 is described. In this production method, the first member 12 is used as a container for forming the second member 16. The first member 12 having a single layer structure and the second member 16 having an n-layer structure are integrally formed to fabricate the preform 11 having (n+1) layers in total. The total layers of the preform 11, a forming method of the first member 12, and the method for integrating the first member 12 and the second member 16 are not limited to the above. For instance, it is also possible to form a tubular first member which is the outer shell of the plastic optical fiber in a tubular container.

Thereafter, the second member 16 which is the optical transmission section constituted of (n−1) layers is formed in the hollow of the first member 12, and thus the preform 11 having the n layers in total is fabricated. It is also possible to form the second member 16 in a tubular container having the same diameter as the first member 12. The second member 16 is taken out from the container, and fit into a previously formed first member 12 to fabricate the preform 11. The first member 12 can be formed by rotating and polymerizing a polymerizable compound in the tubular container, or by melt-extrusion molding of a polymer.

The first layer forming process 31 has a supplying process 37 in which a material of the first layer 21 is poured into a hollow of the first member 12, and a polymerization process 38 in which a polymer is generated by polymerization of the poured material. The second layer forming process 32 and thereafter are basically the same as the first layer forming process 31. Therefore, the illustration of the supplying process and polymerization process of each of the layer forming process is omitted. Thus, the second member 16 is formed by sequentially forming each layer over the previously formed layer in the hollow of the first member 12.

The refractive index of the first member 12 is lower than that of the adjacent first layer 21 of the second member 16 by at least $5 \times 10^{-3}$. In the second member 16, the refractive index of the outer layer is lower than that of the adjacent inner layer by at least $5 \times 10^{-3}$. Thus, the refractive index of the second member 16 is gradually increased toward the center of the cross-section circle. The refractive index of the first layer 21 which is the outermost layer of the second member 16 is not less than 1.4 and not more than 1.5. Thus, the transmission loss is further reduced. The refractive indices from the first layer 21 to the nth layer 24 can be changed gradually or in a step-wise manner.

The first member 12 is constituted of a polymer having a crystalline structure which improves physical properties such as elongation and strength of the POF. As a result, deformation of the POF is prevented when it is bent. A polymerizable compound which generates a polymer constituting the first member 12 by polymerization preferably has a crystalline structure and fluorine atoms. Such polymerizable compound achieves the low refractive index, and improves the physical strength of the POF compared to current products. Polyvinylidene fluoride (PVDF), tetrafluoroethylene-hexafluoropropylene-vinylidenefluoride (THV) copolymer, tetrafluoroethylene-hexafluoropropylene (FEP) copolymer, polytetrafluoroethylene-perfluoro alkylvinyl ether (PFA), and the like are preferable as the polymer for the first member 12. In terms of low refractive index, THV is especially preferable.

The polymer constituting the second member 16 is generated by polymerization of a first polymerizable compound represented by a general formula shown in Chemical formula 1, and a second polymerizable compound represented by a general formula shown in Chemical formula 2. In the present invention, the first and second polymerizable compounds are mixed and copolymerized, satisfying $1/99 \leq W2/(W1+W2) \leq 40/60$, when a weight of the first polymerizable compound is represented as W1, and a weight of the second polymerizable compound is represented as W2. Thereby, a scattering loss, that is, a transmission loss caused by scattering of light is prevented in the second member 16. It is more preferable that the W1 and W2 satisfy $5/95 \leq W2/(W1+W2) \leq 40/60$. It is further more preferable that the W1 and W2 satisfy $10/90 \leq W2/(+W2) \leq 40/60$. In the case W2/(W1+W2) is less than 1/99, copolymerization of the first and second polymerizable compounds does not have a significant advantage over homopolymerization thereof, because it becomes difficult to control the refractive index and Tg. On the other hand, in the case W2/(W1+W2) is more than 40/60, the scattering loss increases. As a result, the produced POF is not suitable for the transparent optical member. The Tg can be increased and the physical properties can be improved by containing shorter alkyl chains or aromatic groups in side chains of the compounds shown in Chemical formulae 1 and 2.

In the general formula shown in the Chemical formula 1, each of $R^1$ and $R^2$ is H or D. $R^3$ is H, D, $CH_3$, $CD_3$ or a halogen atom. $R^4$ is an alkyl group having 2 to 8 carbon atoms, in which a fluorine atom substitutes for H. It is preferable that halogen atom is a fluorine atom or a chlorine atom. In this specification, H is a hydrogen atom, and D is a deuterium atom.

In the Chemical formula 1, it is preferable that each of $R^1$ and $R^2$ is D. It is preferable that $R^3$ is H, D, $CH_3$, $CD_3$, a fluorine atom, or a chlorine atom. It is preferable that $R^4$ is an alkyl group having 2 to 6 carbon atoms, in which a fluorine atom substitutes for H. The alkyl group in which the fluorine atom substitutes for H may contain a branch structure or a cyclic structure, but a linear structure is preferable. In the above alkyl group, it is preferable that C-D bonds substitutes for a part of or the entire of the C—H bonds. That is, the first polymerizable compound represented in the Chemical formula 1 preferably has deuterated fluoroalkyl methacrylate, and deuteration ratio is preferably not less than 95% and less than 100%.

Examples of the compounds represented by the general formula shown in the Chemical formula 1 will be shown in the following Chemical formulae 3 and 4. However, the following examples do not limit the compounds represented by the general formula shown in the Chemical formula 1.

[Chemical formula 3]

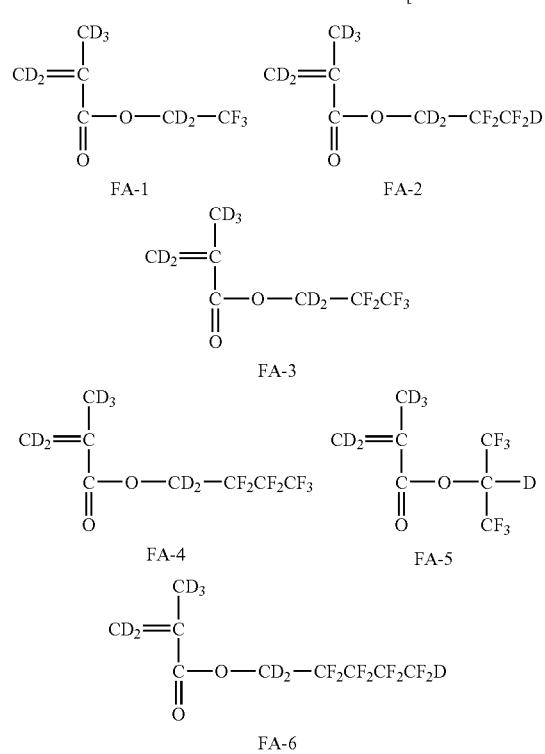

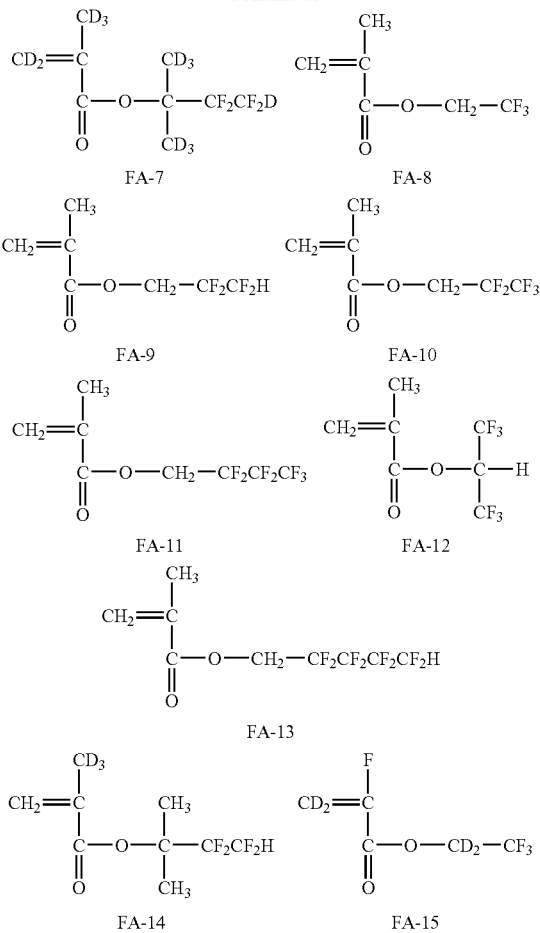

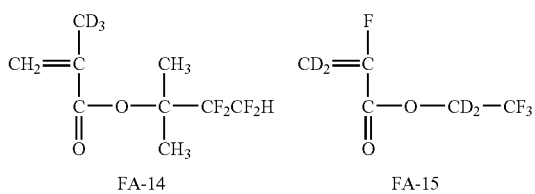

[Chemical formula 4]

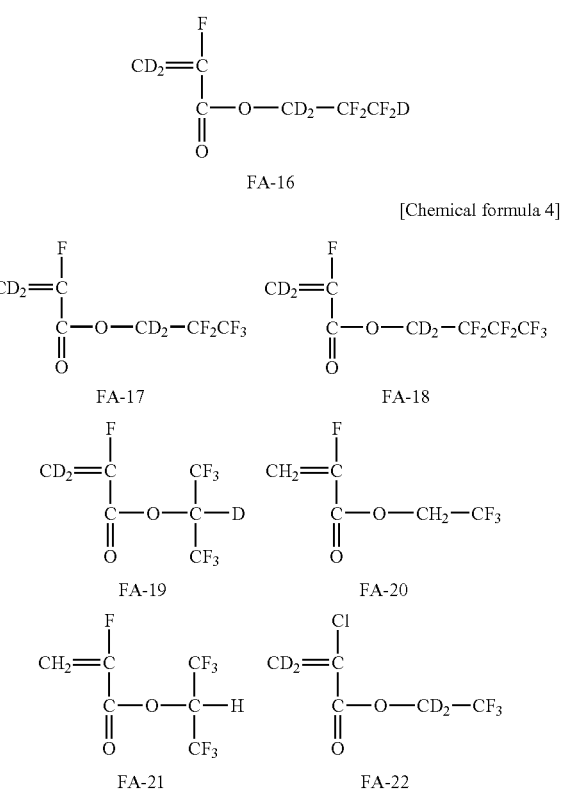

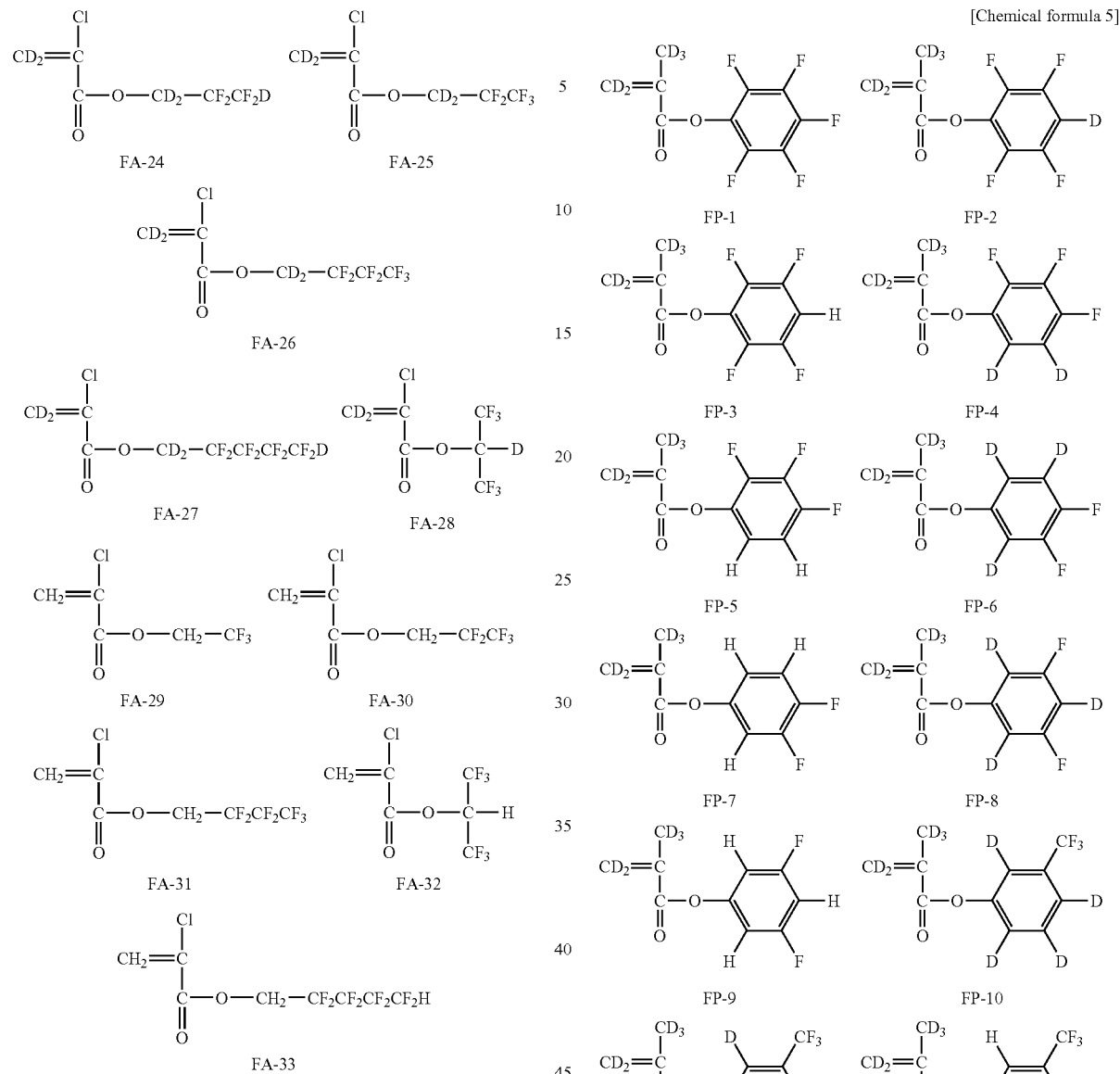

In the general formulae shown in the Chemical formula 2, each of $R^1$ and $R^2$ is H or D. $R^3$ is H, D, $CH_3$, $CD_3$ or a halogen atom. Each of $X^1$ to $X^5$ is H, D, a halogen atom, or $CF_3$. At least one of $X^1$ to $X^5$ is a halogen atom or $CF_3$.

In the Chemical formula 2, each of $R_1$ and $R_2$ is preferably D. $R^3$ is preferably H, D, $CH_3$, $CD_3$, a fluorine atom, or a chlorine atom, and more preferably $CD_3$. Each of $X^1$ to $X^5$ is preferably a fluorine atom, a chlorine atom, or $CF_3$, and more preferably the fluorine atom or the chlorine atom. The number of substituted halogen atom (preferably fluorine atom) in phenyl group of the Chemical formula 2 is preferably 2 or more, and most preferably 3 or more. That is, the second polymerizable compound represented by a general formula of the Chemical formula 2 preferably contains deuteriated halogenated phenyl methacrylate, and its deuteration ratio is preferably not less than 95% and less than 100%.

Examples of the compounds represented by the general formula shown in the Chemical formula 2 are illustrated in the following Chemical formulae 5 and 6.

-continued

[Chemical formula 6]

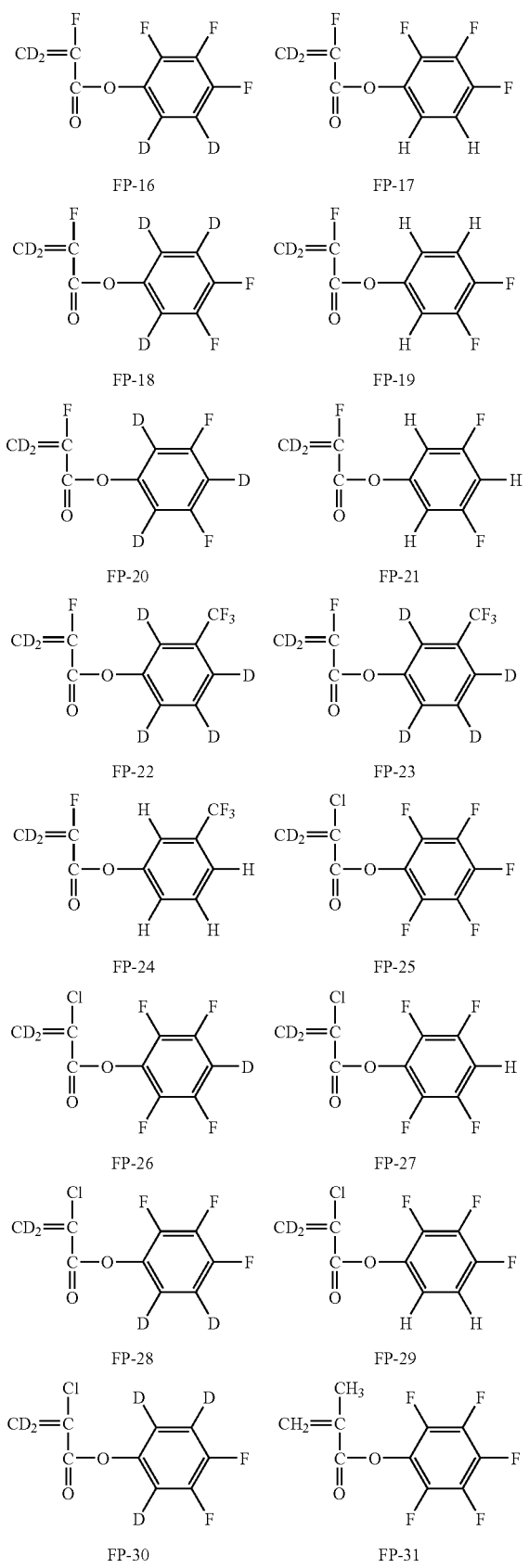

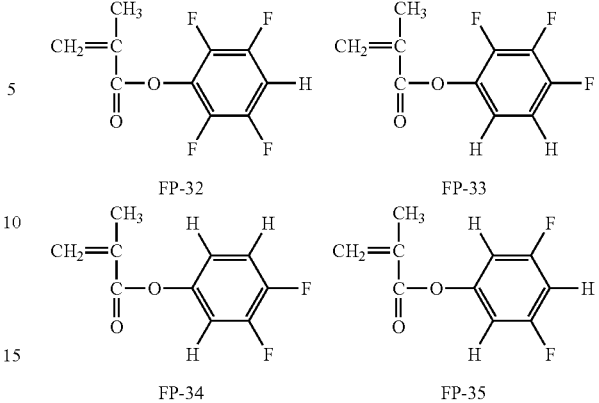

Since the refractive index of the homopolymer generated from the first polymerizable compound represented by the Chemical formula 1, and that of the homopolymer generated from the second polymerizable compound represented by the Chemical formula 2 differ from each other, copolymers having various refractive indices can be synthesized by changing composition ratio of the first and second polymerizable compounds. For instance, refractive index of a homopolymer generated from the above FA-1 is 1.42, a refractive index of a homopolymer generated from the above FP-1 is 1.50. Therefore, by mixing the FA-1 and FP-1 with a different composition ratio in each supplying process of Ith layer (I is a natural number) and (I+1)th layer, Ith and (I+1)th layers exhibit different refractive indices. Likewise, by gradually changing the composition ratio of the first and second polymerizable compounds from the first layer 21 to nth layer 24, the refractive index of the preform gradually changes from the outer side toward the center of the cross-section circle, that is, the preform having a refractive index profile is fabricated. The composition ratio is changed under the condition where $W2/(W1+W2)$ satisfies the above range.

It is also possible to add the following to the first and second polymerizable compounds: a copolymer of methylmethacrylate (MMA) and fluoro(meth)acrylate such as trifluoroethyl methacrylate (3FM), hexafluoro isopropyl methacrylate, or the like; a copolymer of MMA and alicyclic (meth)acrylate such as (meth)acrylate having branches of tert-butylmethacrylate or the like, isobornyl methacrylate, norbornyl methacrylate, tricyclodecanyl methacrylate, or the like; polycarbonate (PC); norbornene-based polymer, for instance, ZEONEX (registered trademark) produced by Zeon Corporation; functional norbornene-based polymer, for instance, ARTON (registered trademark) produced by JSR Corporation; fluorine polymer, for instance, polytetrafluoroethylene (PTFE); PVDF, or the like; a copolymer of fluorine polymer, for instance, a PVDF-based copolymer; a tetrafluoroethylene-perfluoro alkylvinyl ether (PFA) random copolymer; a chlorotrifluoroethylene (CTFE) copolymer, or the like.

In order to use the POF 15 for transmitting near-infrared rays, polymers such as described in Japanese Patent No. 3332922 and Japanese Patent Laid-Open Publication No. 2003-192708 are utilized. In this polymer, deuterium atom, fluorine and so forth substitute for the hydrogen atom of a C—H bond. By using this kind of the polymer, it becomes possible to reduce the loss of the transmission signal light by shifting the wavelength region causing the transmission loss to the longer-wavelength. Examples of such polymers are, for instance, deuteriated polymethylmethacrylate (PMMA-d8), polytrifluoroethylmethacrylate (P3FMA), and polyhexafluoro isopropyl-2-fluoroacrylate (HFIP 2-FA). However, if the amount of such polymers exceeds a certain value, transmission properties and production suitability of the produced POF may be changed. Therefore, it is preferable to add the minimum amount of the above polymers to achieve the effect. It is especially preferable not to add the above polymers. It is desirable that the impurities and foreign materials causing diffusion are properly removed from the raw compound before polymerization so as to keep the transparency of the POF after polymerization.

To change the refractive index of the second member 16 in the diameter direction more efficiently, a refractive index control agent is added to the above polymerizable compounds. The ratio of the refractive index control agent can be changed in each layer. In this case, the adding ratio is increased from the outer layer toward the inner layer to fabricate the preform having the above refractive index profile. The refractive index control agent will be described in detail later.

It is preferable to use a polymerization initiator for the polymerization of the polymerizable compounds. The polymerization initiator is selected in accordance with the sorts and the compounding ratio of the first and second polymerizable compounds.

Preferable examples of the polymerization initiators are described in WO 93/08488, for instance, benzoil peroxide (BPO), and peroxide compound such as tert-butylperoxy-2-ethylhexanate (PBO), di-tert-butylperoxide (PBD), tert-butylperoxyisopropylcarbonate (PBI), n-butyl-4,4-bis(tert-butylperoxy)valarate (PHV), and the like. Other examples of the polymerization initiators are azo compounds, such as 2,2'-azobisisobutylonitril, 2,2'-azobis(2-methylbutylonitril), 1,1'-azobis(cyclohexane-1-carbonitryl), 2,2'-azobis(2-methylpropane), 2,2'-azobis(2-methylbutane) 2,2'-azobis(2-methylpentane), 2,2'-azobis(2,3-dimethylbutane), 2,2'-azobis(2-methylhexane), 2,2'-azobis(2,4-dimethylpentane), 2,2'-azobis (2,3,3-trimethylbutane), 2,2'-azobis(2,4,4-trimethylpentane), 3,3'-azobis(3-methylpentane), 3,3'-azobis(3-methylhexane), 3,3'-azobis(3,4-dimethypentane), 3,3'-azobis (3-ethylpentane), dimethyl-2,2'-azobis(2-methylpropionate), diethyl-2,2'-azobis(2-methylpropionate), di-tert-butyl-2,2'-azobis(2-methylpropionate), and the like. Note that the polymerization initiators are not limited to the above substances. It is also possible to combine two or more kinds of polymerization initiators.

Azo compounds not containing nitrile group, that is, nitrile group-free azo compounds are preferable as the polymerization initiator. The azo-based compound is preferable for the polymerization initiator of (meth)acrylate-based monomer. However, due to its heat coloring property, the azo-based compound affects optical transmission property required for the optical member such as optical fiber or the like. Coloring of the optical member is significant especially when mercaptans are used as the chain transfer agent. Therefore, by using the nitrile group-free azo compound, optical member having high optical transmission property is produced without reduction of the color transmission property due to coloring. Examples of nitrile group-free azo compounds are disclosed in Japanese Patent Laid-Open Publication No. 2003-246813 and No. 2003-192714. In particular, MAIB (dimethyl-2,2'-azobis(isobutyrate)) is preferable.

The chain transfer agent can be used for controlling the polymerization degree. The kind and the amount of the chain transfer agent are selected in accordance with the kinds of the polymerizable monomer. The chain transfer coefficient of the chain transfer agent to the respective monomer is described, for example, in "Polymer Handbook, $3^{rd}$ edition", (edited by J. BRANDRUP & E. H. IMMERGUT, published by JOHN WILEY&SON). In addition, the chain transfer coefficient may be calculated through the experiments in the method described in "Experiment Method of Polymers" (edited by Takayuki Ohtsu and Masayoshi Kinoshita, published by Kagaku-Dojin Publishing Company, Inc., 1972).

Preferable examples of the chain transfer agent are alkylmercaptans [for instance, n-butylmercaptan; n-pentylmercaptan; n-octylmercaptan; n-laurylmercaptan; tert-dodecylmercaptan, and the like], and thiophenols [for example, thiophenol; m-bromothiophenol; p-bromothiophenol; m-toluenethiol; p-toluenethiol, and the like]. It is especially preferable to use n-octylmercaptan, n-laurylmercaptan, and tert-dodecylmercaptan in the alkylmercaptans. Further, the hydrogen atom on C—H bond may be substituted by the fluorine atom (F) or a deuterium atom (D) in the chain transfer agent. Note that the chain transfer agents are not limited to the above substances. It is also possible to combine two or more kinds of chain transfer agents.

A nonpolymerizable compound is preferable as the refractive index control agent. A ratio of the refractive index control agent is preferably from 0.01 wt. % to 25 wt. % with respect to the main component of the second member 16, and more preferably from 1 wt. % to 20 wt. %. The refractive index control agent ensures the development of the above-described refractive index profile.

It is preferable that the refractive index control agent has at least one of the following properties: high refractive index; large molecular volume; not affecting polymerization of the polymerizable compound; and the refractive index control agent is a low molecular compound having a certain diffusion velocity in a melted polymer. The refractive index control agent is not limited to monomers, and can be oligomers (including dimers and trimers).

Examples of the refractive control agents are, for instance, non-polymerizable low molecular compound such as benzyl benzoate (BEN), diphenyl sulfide (DPS), triphenyl phosphate (TPP), benzyl n-butyl phthalate (BBP), diphenyl phthalate (DPP), diphenyl (DP), diphenylmethane (DPM), tricresyl phosphate (TCP), diphenylsulfoxide (DPSO) and the like. In particular, BEN, DPS, TPP and DPSO are preferable. By adding such refractive index control agent to the material for forming the second member 16, and by controlling the concentration of the refractive index control agent in each layer, the refractive index of each of first to the nth layers 20 to 24 is controlled with ease.

Preferable adding amounts of the polymerization initiator, the chain transfer agent, and the refractive index control agent are properly determined in accordance with the kind and so forth of the polymerizable compounds. The ratio of the polymerization initiator in each layer 21 to 24 is preferably 0.005 mol % to 0.5 mol %, and more preferably 0.010 mol % to 0.1 mol % with respect to the polymerizable compounds Further, the ratio of the chain transfer agent in each layer 21 to 24 is preferably 0.005 mol % to 0.5 mol %, and more preferably 0.01 mol % to 0.1 mol % with respect to polymerizable compounds in each layer.

In addition, other additives can be added to a part of layers 21 to 24 so far as the optical transmission property does not decrease. For instance, a stabilizer can be added to each of the layers 21 to 24, or to a part of the layers 21 to 24 so as to improve the weather-resistance property and durability.

Further, to improve the optical transmission property, an induced emissive functional compound which amplifies the optical signal can be added to the first and second polymerizable compounds. By adding such compound, attenuated signal light is amplified by excitation light so that the transmission distance increases. Therefore, the optical member with such additive can be used as, for instance, an optical fiber amplifier in an optical transmission link.

Figure 3:
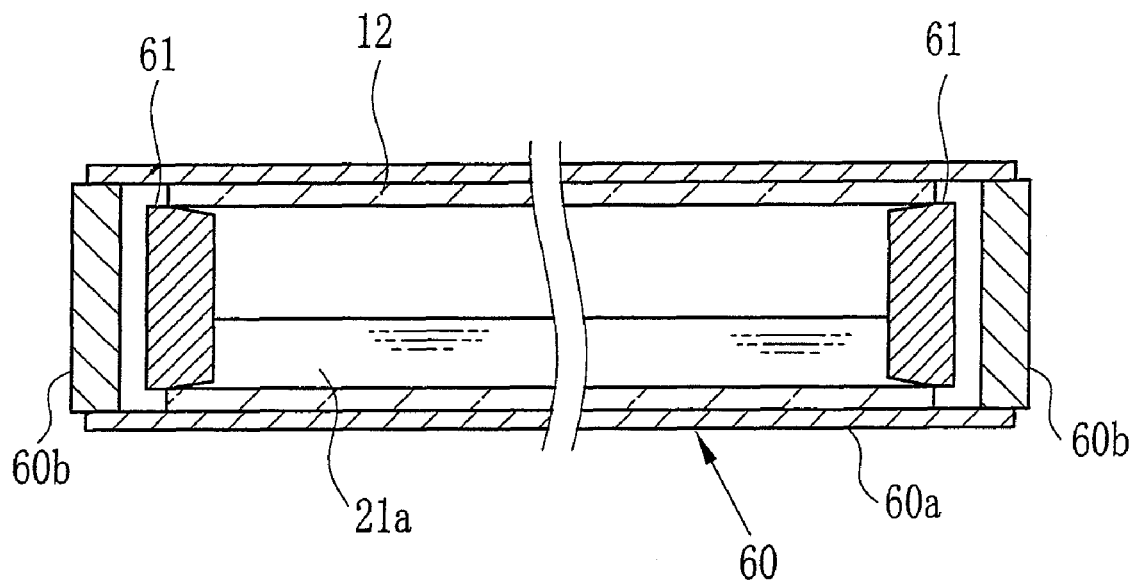
FIG. 3 is a cross-section of a polymerization container in a first layer forming process.

The production method of the second member 16 is described in the following. However, the embodiment is an example of the present invention, and does not limit the scope of the present invention. In FIG. 3, a polymerization container 60 made of SUS has a tubular main body 60a, and a pair of lids 60b to seal the both ends of the main body 60a. The inner diameter of the polymerization container 60 is slightly larger than the outer diameter of the first member 12. The polymerization container 60 is configured such that the first member 12 rotates in accordance with the rotation of the polymerization container 60.

The first member 12 formed by using a commercially available melt-extrusion molding apparatus is placed in the polymerization device 60. Next, one of plugs 61 is fit into one side end of the first member 12. The plugs 61 are made of a material which does not dissolve into the materials for forming the first to the nth layers. For instance, the plugs 61 are made of PTFE, or the like.

A first layer material 21a, that is, the first and the second polymerizable compounds are poured into a hollow of the first member 12. The other end of the first member 12 is sealed by the other plug 61, and the lids 60b are fit into the main body 60a. It is also possible to use the first member and the plugs 61 without the use of the polymerization container 60. The first layer is formed by copolymerization of the first and second polymerizable compounds while the polymerization container 60 is rotated. It is also possible to provide support members for supporting the first member 12 inside the polymerization container 60 so as to support the first member 12 to follow the rotation of the polymerization container 60.

Figure 4:
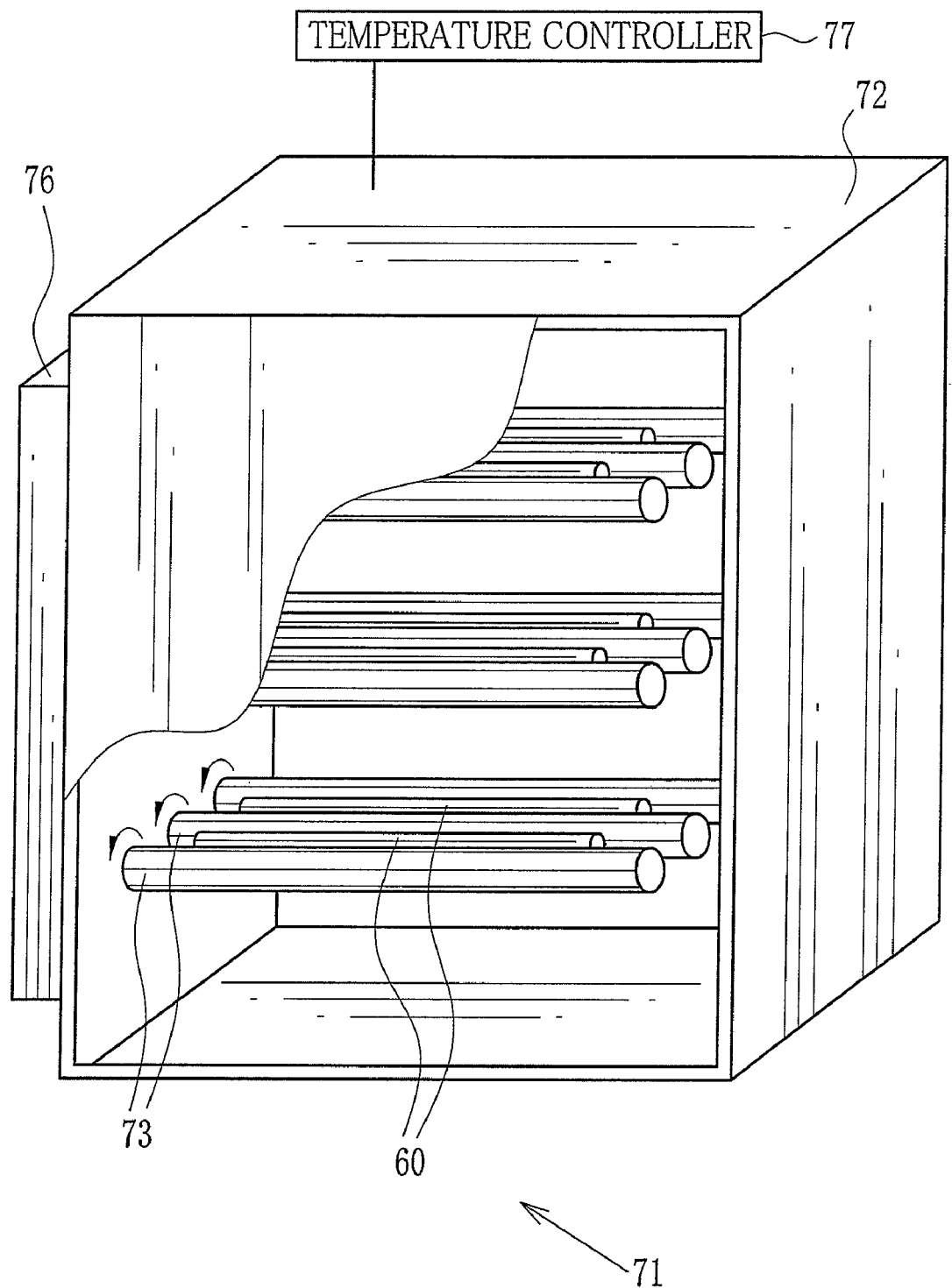
FIG. 4 is a schematic view of a rotation polymerization device.

A rotation polymerization device is used for rotating the polymerization container 60. In FIG. 4, a rotation polymerization device 71 has plural rotation support members 73 disposed in a housing 72, a driving section 76 which rotates the rotation support members 73, and a temperature controller 77 for measuring the temperature in the housing 72 and for controlling the temperature based on the measured result.

Each of the rotation support members 73 has a cylindrical shape. The rotation support members 73 are approximately horizontally installed, and approximately parallel to each other in the lengthwise direction such that at least one polymerization container 60 is supported by circumferential surfaces of two adjacent rotation support members 73. One end of each of the rotation support members 73 is rotatably attached to a side wall of the housing 72. Each of the rotation support members 73 is independently rotated by the driving section 76. The driving section 76 is provided with a controller (not shown) for controlling the activation of the driving section 76.

Figure 5:
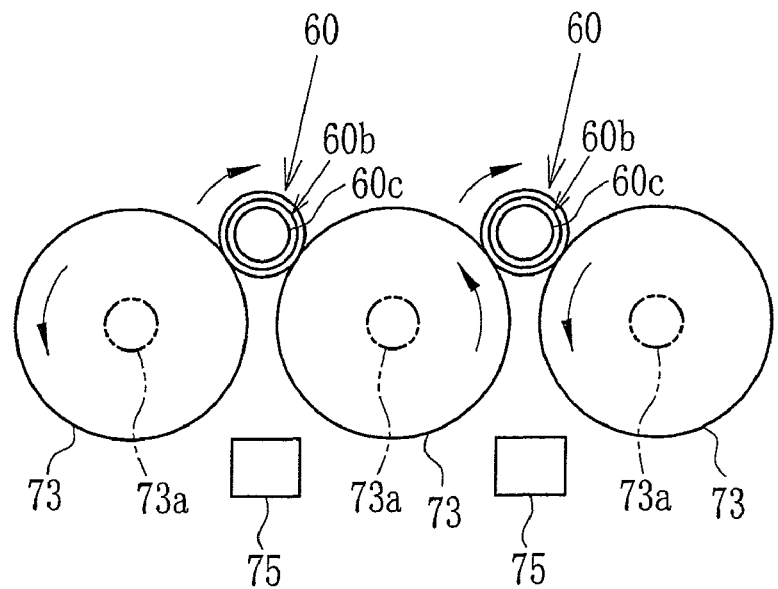
FIG. 5 is an explanatory view of rotation polymerization.

As shown in FIG. 5, during the polymerization, each polymerization container 60 is held by two adjacent rotation support members 73. The polymerization container 60 is rotated in accordance with the rotation of the rotation support member 73. In FIG. 5, a numeral 73a indicates a rotation axis of the rotation support members 73. Thus, the polymerization container 60 is set in the rotation polymerization device 71 and rotated to generate the copolymer having the tubular or cylindrical shape. In this embodiment, the polymerization container 60 is rotated by a surface-drive method. However, the rotation method is not particularly limited.

A magnet 60c is attached to each of the lids 60b sealing the side ends of the polymerization container 60. A magnet 75 is provided below each of the rotation support members 73. These magnets 60c and 75 prevent a lift of the polymerization container 60 from the rotation support members 73 during the rotation. Other than the above method, it is also possible to prevent the lift by placing a rotation member similar to the rotation support member 73 such that the rotation member touches the upper surface of the polymerization container 60 set in the rotation polymerization device 60, and by rotating such rotation support member in the same direction as the rotation support member 73. It is also possible to prevent the lift by providing a holding device above the polymerization container 60, pressing against the polymerization container 60. Note that the present invention does not depend on the lift preventing method. As described above, to form the first layer over the entire inner wall of the first member 12, it is most preferable to keep the first member 12 horizontal in the lengthwise direction. The first member 12 can be approximately horizontal in the lengthwise direction, and an allowable angle of the rotation axis is approximately not more than 5° with respect to the horizontal direction.

Before the above polymerization, it is also possible to perform pre-polymerization of the polymerizable compounds while the first member 12 is kept in the upright position. During the polymerization, it is preferable to rotate the first member 12 around a cylindrical axis of the first member 12.

Prior to the polymerization, it is preferable to remove materials which may act as polymerization inhibitors, moisture, impurities, and the like from the materials including the first and second polymerizable compounds by filteration, distillation, or the like. In addition, after mixing the polymerizable compounds and the polymerization initiator, it is preferable to remove dissolved gases and volatile materials from the mixture by ultrasonic treatment. It is also possible to decompress the first member 12 and the first layer forming material 21a by a known decompression device before or after the first layer forming process.

Thus, the first layer is formed in the hollow of the first member 12. Then, the first member 12 in which the first layer is formed is taken out from the rotation polymerization device 71. In this embodiment, the first member 12 is heated for a predetermined time in a heating device such as a thermostatic chamber at a predetermined temperature.

Figure 6:
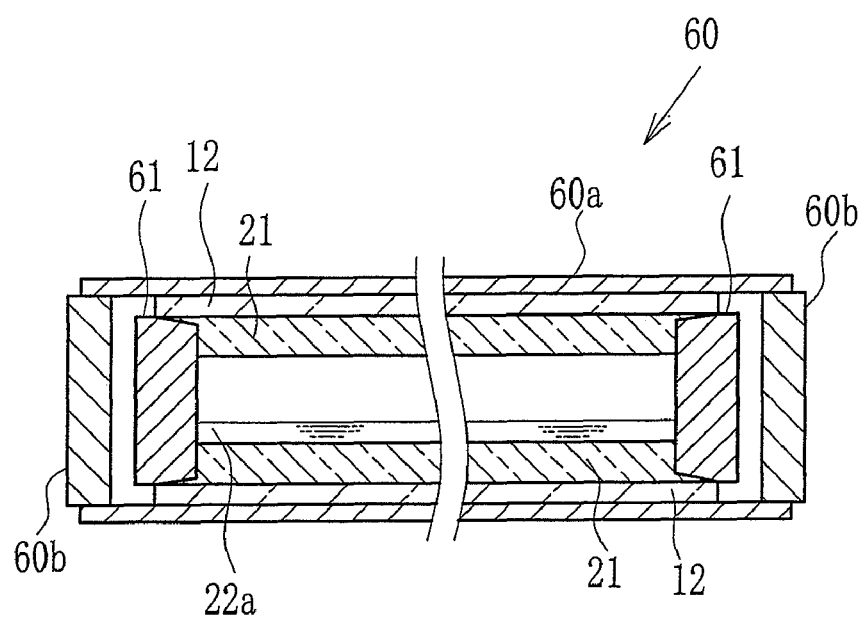
FIG. 6 is a cross-section of the polymerization container in a second layer forming process.

Thereafter, the second to the nth layers are sequentially formed. In FIG. 6, the same numeral 60 denotes the polymerization container, since it is the same as that used for generating the first layer 21. First, a second layer forming material 22a is poured into the hollow of the first member 12.

The opening of the first member 12 is sealed by the plug 61. The first member 12 in which the first layer 21 is formed is set approximately horizontal in the lengthwise direction. The polymerization is started while the first member 12 is rotated around a center of the cross-section circle. Thus, the second layer is formed by promoting the polymerization while the first member 12 is rotated. The rotation polymerization device 71 (see FIG. 4) is used for copolymerization of the first and second polymerization compounds in forming each of the $2^{nd}$ to nth layers in the same manner as in forming the first layer 21. It is also possible to decompress the first member 12, and the layer forming material by a known decompression device before or after pouring each layer forming material into the first member 12 as necessary.

At the start of the copolymerization of the first and second copolymerizable compounds for the second layer, the inner wall of the first layer 21 is swelled by the contact of the first and second polymerizable compounds for the second layer. As a result, a swelled layer is formed at the initial stage of the polymerization. The swelled layer in gel form accelerates the polymerization speed, that is, a gel effect. In this specification, a tubular member is previously produced, and the polymerizable compounds are poured therein. The swelled layer is formed by a reaction of the tubular member and the polymerizable compounds poured therein to polymerize the polymerization compounds. This reaction method is referred to as a rotation gel polymerization method. In the polymerization method, it is preferable to set the tubular member horizontal in the lengthwise direction as in this embodiment.

In forming each layer, it is preferable to properly adjust the reaction speed of the polymerization. For instance, it is preferable to adjust a conversion ratio representing a degree of polymerization of the polymerizable compounds to be 5% to 90% per hour. More preferably, the conversion ratio is adjusted to be 10% to 85% per hour. Further more preferably, the conversion ratio is adjusted to be 20% to 80%. The reaction speed can be controlled according to the type of the polymerization initiator, or by adjustment of the polymerization temperature. The method to measure the conversion ratio of the polymerizable compounds is not particularly limited so long as the well known method is used. For instance, both a quantitative analysis of the remaining polymerizable compounds by gas chromatography, and a visual inspection of the reaction product are performed to obtain the correlation therebetween. Thereafter, the visual inspection is performed to obtain the conversion ratio on the basis of the above correlation. It is also possible to control the conversion ratio of polymerization in each layer by properly adjusting the rotation speed.

Thus, the second member is produced by forming a multilayer structure having the first to nth layers inside the first member. The first to nth layers are formed from the above-described materials. It is also possible to separately form the first and second members 12 and 16. Thereafter, the second member 16 is fit into the tubular first member 12 to fabricate the preform 11.

It is preferable to decompress the preform 11 while the preform 11 is heated. Thus, residues such as unreacted polymerizable compounds are removed from the preform 11.

The POF having a diameter in a range of, for instance, 200 μm to 1000 μm is obtained by heat-drawing the preform 11. Various methods can be applied to the heat-drawing of the preform 11, for instance, a method disclosed in Japanese Patent Laid-Open Publication No. 07-234322.

The POF is not restricted to GI (Graded Index) POF. The present invention is not restricted to a typical refractive index profile graph having a horizontal axis which is a diameter direction of a cross-section circle of the produced optical transmission medium such as the POF or the preform, and a vertical axis which is the refractive index. Therefore, in the second member forming process, it is possible to produce the POF or the preform having a W-shaped refractive index profile, a concave-shaped refractive index profile, or the like by arbitrarily setting the ratio of W2/(W1+W2) in forming each layer.

The POF is normally coated with at least one protective layer, for the purpose of improving flexural and weather resistance, preventing performance degradation caused by moisture absorption, improving tensile strength, providing resistance to stamping, providing resistance to flame, protecting from damage caused by chemical agents, noise prevention from external light, increasing the value by coloring, and the like to enhance the marketability of the POF.

A plastic optical fiber cord (hereinafter referred to as a cord) is obtained by providing a protective coating layer around the outer periphery of the POF. Normally, a secondary coating is applied after the primary coating. However, the protective coating layer is not limited to a single or double layer.

It is also possible to form a plastic optical fiber cable (hereinafter referred to as an optical cable) by stranding the several cords. In this specification, a single POF provided with the additional coating as necessary around the outer periphery thereof is referred to as a single optical cable. When plural cords are stranded with a tension member, and the coating is applied to the outer periphery of the stranded cords, it is referred to as a multi-fiber cable. The single fiber cable and the multi-fiber cable are collectively called as the optical cables.

The single fiber cable to which only the primary coating has been applied can be used as the optical fiber. In this case, the primary coating layer is an outer surface layer of the optical fiber. There are two types of coating applied to the optical fiber: an adhesion-type coating and a loose-type coating. In the adhesion-type coating, the single cord and the coating layer, or the outer periphery of the stranded cords and the coating layer are adhered. In the loose-type coating, there is a space between the cord and the coating layer. Normally, the adhesion-type coating is more preferable than the loose-type coating, because, for instance, moisture may enter into the space between the cord and the coating layer, and be diffused in the lengthwise direction when the coating layer is peeled off at the connecting section connected to the connector.

On the other hand, since the coating layer and the cord are not adhered in the loose-type coated optical cable, most of damages such as stress and heat can be relaxed by the coating layer. Owing to this, the loose-type coated optical cable can be preferably used in accordance with the applications. In the loose-type coated optical cable, propagation of moisture from the connecting portion can be prevented by filling a flowable gel-like semi-solid substance or powders in the space between the cord and the coating layer. Further, by adding other functions such as heat resistance and improved mechanical functions to the semi-solid substance or to the powders, optical fiber cable having a multi-function coating layer can be produced. To form a loose-type coating layer, the space can be made between the cord and the coating layer by adjusting the position of a head nipple of a cross-head die, and the decompression degree of the decompression device. The thickness of the space can be adjusted by changing the size of the opening of the head nipple, and by compressing and/or decompressing the space. It is also possible to add a flame retardant, an ultraviolet absorber, an anti-oxidant, a lubricant, and the like to the coating layers formed by the primary and secondary coating processes so long as the above agents do not affect the optical transmission property.

The flame retardants are polymers and additives containing halogen such as bromine or those containing phosphorus. In view of safety such as reducing toxic gas emission, metal hydroxides such as aluminum hydroxide and magnesium hydroxide are commonly used. However, these metal hydroxides contain water of crystallization due to adhesion of water during the production process of the metal hydroxides, and it is impossible to remove this water of crystallization completely. Therefore, to impart the flame retardant property by the metal hydroxide, it is preferable to add the metal hydroxide not in the coating layer contacting the cord, but only in the exterior coating layer.

The optical cable may be coated with plural coating layers with multiple functions. Examples of such coating layers other than the flame retardant layer described above are a barrier layer to prevent moisture absorption, a moisture absorption layer (a moisture absorption tape or gel, for instance) for removing the moisture contained in the POF, and the like. The moisture absorption tape or gel can be provided in the protective layer, or between the protective layers.

Examples of other function layers are a flexible material layer to relax stress in bending the POF, and a foaming material layer as shock absorbers to the stress from the outside, a reinforced layer to increase rigidity, and the like. Examples of the materials of the coating layer other than the polymers are, for instance, thermoplastic polymers containing a fiber with high elasticity (that is, a so-called tensile strength fiber) and/or a metal wire with high rigidity. By using such materials, a dynamic strength of the optical cable is reinforced.

Examples of the tensile strength fibers are an aramid fiber, a polyester fiber, a polyamide fiber and the like. Examples of the metal wires are stainless wire, a zinc alloy wire, a copper wire and the like. The tensile strength fibers and the metal wires applied to the present invention are not limited to those listed above. It is also possible to provide other materials such as a metal pipe for protecting the optical cable, and a mechanism to increase working efficiency in wiring the optical cable to the outer periphery of the optical cable.

The optical cable is selectively used according to the applications. The optical cable can be used as a collective-type cable in which the cords are concentrically assembled, a tape-type cable in which the cords are linearly aligned, a cable assembly in which the cords are stranded by holding tapes and protected by LAP sheaths, or the like.

The optical cable formed from the POF of the present invention has high tolerance against shaft misalignment compared to current products. Therefore, such cables can be coupled through a butt joint. It is more preferable to provide an optical connector at each end of the optical cable to ensure fixing of connecting portions. Commercially available optical connectors such as PN type, SMA type, SMI type, and the like can be used. Owing to this, the present invention can be applied to a system to transmit optical signals, which uses optical signal processing devices including optical components, such as a light receiving element, an optical switch, an optical isolator, an optical integrated circuit, an optical transmitter and receiver module, and the like. In addition, it is also possible to use other types of POFs, fiber cables, optical cables, and the like as necessary. Any known techniques can be applied to the above system. See, for instance, "Basic and Practice of Plastic Optical Fiber" (published by NTS Inc.), and "Optical members can be Loaded on Printed Wiring Assembly, at Last" (in Nikkei Electronics, vol. Dec. 3, 2001, pp. 110-127).

By combining the optical member having the POF of the present invention with the techniques in the above publications, the optical member is applicable to short-distance optical transmission systems suitable for high-speed and large capacity data communication, and for control use in electromagnetic wave free environment. In particular, the optical member is applicable to wiring in apparatuses (such as computers and various digital apparatuses), wiring in trains and containers, optical linking between an optical terminal and a digital device, and between digital devices, and optical LAN in houses, collective housings, factories, offices, hospitals, schools, and the like.

Further, other techniques to be combined with the optical transmission system are, for example: techniques disclosed in "High-Uniformity Star Coupler Using Diffused Light Transmission" (in IEICE TRANS. ELECTRON., VOL. E84-C, No. 3, MARCH 2001, pp. 339-344); techniques disclosed in "Interconnection in Technique of Optical Sheet Bath" (in Journal of Japan Institute of Electronics Packaging, Vol. 3, No. 6, 2000, pp. 476-480); an arrangement of light emitting elements on a waveguide surface (disclosed in Japanese Patent Laid-Open Publication No. 2003-152284); an optical bus (disclosed in Japanese Patent Laid-Open Publications No. 10-123350, No. 2002-90571, No. 2001-290055 and the like); an optical branching/coupling device (disclosed in Japanese Patent Laid-Open Publications No. 2001-74971, No. 2000-329962, No. 2001-74966, No. 2001-74968, No. 2001-318263, No. 2001-311840 and the like); an optical star coupler (disclosed in Japanese Patent Laid-Open Publication No. 2000-241655); an optical signal transmission device and an optical data bus system (disclosed in Japanese Patent Laid-Open Publications No. 2002-62457, No. 2002-101044, No. 2001-305395 and the like); an optical signal processing device (disclosed in Japanese Patent Laid-Open Publications No. 2002-23011 and the like); a cross connect system for optical signals (disclosed in Japanese Patent Laid-Open Publications No. 2001-86537 and the like); a light transmitting system (disclosed in Japanese Patent Laid-Open Publications No. 2002-26815 and the like); multi-function system (disclosed in Japanese Patent Laid-Open Publications No. 2001-339554, No. 2001-339555 and the like); and various kinds of optical waveguides, optical branching devices, optical couplers, optical multiplexers, optical demultiplexers and the like. When the optical system having the optical member according to the present invention is combined with these techniques, it is possible to construct an advanced optical transmission system to send/receive multiplexed optical signals. The optical member according to the present invention is also applicable to other purposes, such as for lighting (light transmission), energy transmission, illumination, lenses, and sensors.

Embodiment 1

The POF 19 having the first member 12, and the second member 16 constituted of 11 layers was produced according to the production process 10 in FIG. 1. A PVDF tube produced by melt-extrusion molding with an inner diameter of 20 mm and a length of 27 cm was used as a container for forming the second member 16. The refractive index of the PVDF was 1.41. The material 21a for forming the first layer was filtered through a PTFE membrane filter having a pore diameter of 0.2 μm. The polymerizable compounds contained in each of the materials for forming the first layer 21 to the 11$^{th}$ layer were a deuteride of 2,2,2-trifluoroethyl methacrylate (3FMd7) and a deuteride of pentafluorophenyl methacrylate (PFPMAd5). Refractive index of a homopolymer of the 3FMd7 was 1.41. Refractive index of a homopolymer of PFPMAd5 was 1.49. A compounding ratio of 3FMd7 and PFPMAd5 in each material was shown in Table 1 in which W1(g) indicates a weight of 3FMd7 and W2(g) indicates a weight of PFPMAd5. After 3FMd7 and PFPMAd5 were mixed, a polymerization initiator (MAIB) and a chain transfer agent (ethyl 3-mercapto propionate) were added to the mixture. A ratio of MAIB to the liquid mixture of 3FMd7 and PFPMAd5 was 0.1 mol %. A ratio of 3-mercapto propionate ethyl to the liquid mixture of 3FMd7 and PFPMAd5 was 0.05 mol %.

The material 21a was poured into the PVDF tube, and then subjected to thermal polymerization in an atmosphere of 90° C. for two hours while the PVDF tube was rotated at 2000 rpm. The polymerization container 60 was made of SUS. In the proximity of the rotating polymerization container 60, to be more specific, at a position 1 cm to 2 cm away from the rotating polymerization container 60, an isolated thermocouple was provided to measure the temperature which was regarded as a polymerization temperature. Further, a temperature peak (a heat peak) of the measured values was acquired. In the Embodiment 1, 1 hour and 20 minutes after the start of the polymerization, the polymerization temperature reached a heat peak of 67° C. Thus, the first layer 21 was formed in the hollow of the PVDF tube. The conversion ratio of the obtained polymer was 90%.

Next, the PVDF tube in which the first layer 21 has been formed is taken out of the polymerization container 60. The material 22a for forming the second layer is poured into the hollow of the PVDF tube, and the material 22a is subjected to the thermal polymerization under the same conditions as above. Refractive index of the first layer 21 was 1.432. Thereafter, the third layer to the $11^{th}$ layer was formed sequentially. The polymerization conditions in each of the second layer to $11^{th}$ layer were the same as in the first layer 21. An amount of each of the materials for the first layer 21 to the $11^{th}$ layer was gradually reduced from the first layer toward the $11^{th}$ layer as shown in Table 1.

The PVDF tube formed with the second member on the inner wall thereof was heated at 90° C. for six hours to polymerize the remaining first and second polymerizable compounds. Thereafter, the second member 16 is taken out from the PVDF tube.

A tube was formed of Dyneon (registered trademark) THV500G (THV polymer) produced by Sumitomo 3M, Ltd. This tube was used as the first member 12. The second member 16 was fit into the hollow of the first member 12 to fabricate a preform 11. The preform 11 was drawn while being heated at 200° C. Thus, the POF 19 having the outer diameter of 470 µm was formed. The preform 11 was drawn while the hollow 27 thereof was decompressed. The hollow 27 disappeared during the drawing. The outer diameter of the POF 19 was 470 µm±15 µm. Refractive index profile coefficient (g) was 2.2. At the wavelength of 650 nm, the transmission loss of the POF 19 was 90 dB/km. At the wavelength of 780 nm, the transmission loss of the POF 19 was 54 dB/km. At the wavelength of 850 nm, the transmission loss of the POF 19 was 75 dB/km. Measured bandwidth of 50 m was 10 GHz at 850 nm wavelength. The bandwidth was measured by time-domain method. The POF 19 is put in a thermostatic chamber at 70° C. for 100 hours. Thereafter, the transmission loss of the POF 19 is measured. The POF 19 showed no increase in the transmission loss.

TABLE 1

| layer | Producing order | W1 (g) | W2 (g) | {W2/(W1 + W2)} × 100 (%) |
|---|---|---|---|---|
| $1^{st}$ | 1 | 29.48 | 3.32 | 10.0 |
| $2^{nd}$ | 2 | 10.77 | 1.75 | 13.8 |
| $3^{rd}$ | 3 | 9.50 | 2.00 | 17.2 |
| $4^{th}$ | 4 | 8.33 | 2.14 | 20.2 |
| $5^{th}$ | 5 | 7.26 | 2.17 | 22.8 |
| $6^{th}$ | 6 | 6.26 | 2.12 | 25.0 |
| $7^{th}$ | 7 | 5.34 | 1.98 | 26.8 |
| $8^{th}$ | 8 | 4.47 | 1.78 | 28.2 |
| $9^{th}$ | 9 | 3.65 | 1.53 | 29.2 |
| $10^{th}$ | 10 | 2.87 | 1.24 | 29.8 |
| $11^{th}$ | 11 | 2.11 | 0.92 | 30.0 |

Embodiment 2

Embodiment 2 was performed with the same conditions as in the Embodiment 1 except for the compounding ratio of the 3FMd7 and PFPMAd5 in forming each of the first to $11^{th}$ layers as shown in Table 2. In the Table 2, W1 and W2 indicate the same as in the Embodiment 1. At the wavelength of 650 nm, the transmission loss of the POF 19 was 120 dB/km. At the wavelength of 780 nm, the transmission loss of the POF 19 was 80 dB/km. At the wavelength of 850 nm, the transmission loss of the POF 19 was 100 dB/km. Measured bandwidth of 50 m was 10 GHz at 850 nm wavelength. The bandwidth was measured by the time-domain method. The POF 19 is put in a thermostatic chamber at 70° C. for 100 hours. Thereafter, the transmission loss of the POF 19 is measured. The POF 19 showed no increase in the transmission loss.

TABLE 2

| layer | Producing order | W1 (g) | W2 (g) | {W2/(W1 + W2)} × 100 (%) |
|---|---|---|---|---|
| $1^{st}$ | 1 | 26.81 | 6.70 | 20.0 |
| $2^{nd}$ | 2 | 9.75 | 3.04 | 23.8 |
| $3^{rd}$ | 3 | 8.55 | 3.20 | 27.2 |
| $4^{th}$ | 4 | 7.47 | 3.23 | 30.2 |
| $5^{th}$ | 5 | 6.47 | 3.16 | 32.8 |
| $6^{th}$ | 6 | 5.56 | 3.00 | 35.0 |
| $7^{th}$ | 7 | 4.73 | 2.75 | 36.8 |
| $8^{th}$ | 8 | 3.95 | 2.44 | 38.2 |
| $9^{th}$ | 9 | 3.22 | 2.07 | 39.2 |
| $10^{th}$ | 10 | 2.53 | 1.67 | 39.8 |
| $11^{th}$ | 11 | 1.86 | 1.24 | 40.0 |

Embodiment 3

Embodiment 3 was performed with the same conditions as in the Embodiment 1 except for the compounding ratio of the 3FMd7 and PFPMAd5 in forming each of the first to $11^{th}$ layers as shown in Table 3. In the Table 3, W1 and W2 indicate the same as in the Embodiment 1. At the wavelength of 650 nm, the transmission loss of the POF 19 was 400 dB/km. At the wavelength of 780 nm, the transmission loss of the POF 19 was 180 dB/km. At the wavelength of 850 nm, the transmission loss of the POF 19 was 200 dB/km. Measured bandwidth of 50 m was 10 GHz at 850 nm wavelength. The bandwidth was measured by the time-domain method. The POF 19 is put in a thermostatic chamber at 70° C. for 100 hours. Thereafter, the transmission loss of the POF 19 is measured. The POF 19 showed no increase in the transmission loss.

TABLE 3

| layer | Producing order | W1 (g) | W2 (g) | {W2/(W1 + W2)} × 100 (%) |
|---|---|---|---|---|
| $1^{st}$ | 1 | 23.71 | 10.16 | 30.0 |
| $2^{nd}$ | 2 | 8.56 | 4.37 | 33.8 |
| $3^{rd}$ | 3 | 7.46 | 4.42 | 37.2 |
| $4^{th}$ | 4 | 6.46 | 4.35 | 40.2 |
| $5^{th}$ | 5 | 5.57 | 4.17 | 42.8 |
| $6^{th}$ | 6 | 4.76 | 3.89 | 45.0 |
| $7^{th}$ | 7 | 4.02 | 3.54 | 46.8 |
| $8^{th}$ | 8 | 3.34 | 3.11 | 48.2 |
| $9^{th}$ | 9 | 2.72 | 2.63 | 49.2 |
| $10^{th}$ | 10 | 2.13 | 2.11 | 49.8 |
| $11^{th}$ | 11 | 1.56 | 1.56 | 50.0 |

The Embodiments 1 to 3 show that the POF having the second member in which 3FMd7 and PFPMAd5 are copolymerized has higher Tg. Owing to this, the transmission loss does not increase even under high temperature conditions. The compounding ratio of 3FMd7 and PFPMAd5 of the present invention reduce the transmission loss of the POF, and thus the POF with the significantly reduced transmission loss is produced.

INDUSTRIAL APPLICABILITY

The present invention is preferably applied to a production method of a plastic optical fiber used for optical transmission, lighting, energy transmission, illumination, sensor and so forth.

The invention claimed is:

1. A production method of an optical transmission medium comprising the steps of:
    (A) putting a polymerization initiator, a first polymerizable compound represented by a general formula shown in a chemical formula 1, and a second polymerizable compound represented by a general formula shown in a chemical formula 2 in a tubular container, said second polymerizable compound is capable of generating a homopolymer having a higher refractive index than a homopolymer generated from said first polymerizable compound, a weight W1 of said first polymerizable compound and a weight W2 of said second polymerizable compound satisfying $1/99 \leq \{W2/(W1+W2)\} \leq 2/3$;
    (B) copolymerizing said first and second polymerizable compounds in said tubular container while said tubular container being rotated around a center of a cross-section circle vertically intersecting a lengthwise direction of said tubular container;
    (C) alternately repeating said steps (A) and (B) for plural times for concentrically forming plural layers from an inner wall of said tubular container toward said center of said cross-section circle, a value of W2/(W1+W2) in said step (A) for Ith time (I: natural number) being different from a value of W2/(W1+W2) in said step (A) for (I+1)th time;

[Chemical formula 1]

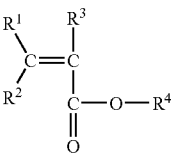

(In a general formula in the chemical formula 1, each of $R^1$ and $R^2$ is H or D, $R^3$ is H, D, $CH_3$, $CD_3$ or a halogen atom, $R^4$ is an alkyl group having 2 to 8 carbon atoms, and a fluorine atom substitutes for H in said alkyl group),

[Chemical formula 2]

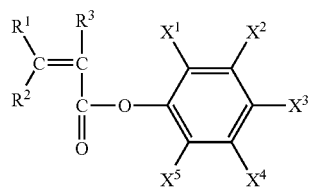

(In a general formula in the chemical formula 2, each of $R^1$ and $R^2$ is H or D, $R^3$ is H, D, $CH_3$, $CD_3$, or a halogen atom, each of $X^1$ to $X^5$ is H, D, a halogen atom, or $CF_3$, and at least one of $X^1$ to $X^5$ is a halogen atom or $CF_3$), wherein an inner wall of a first layer becomes a gel form when copolymerization of said first and second polymerizable compounds for a second layer starts, removing said tubular container from a rotation polymerization device after said first layer is formed, and thereafter heating said first layer, wherein said tubular container is removably attached to said rotation polymerization device.

2. A production method of an optical transmission medium according to claim 1, wherein said value of W2/(W1+W2) in said step (A) for (I+1)th time is larger than said value of W2/(W1+W2) in said step (A) for Ith time.

3. A plastic optical fiber produced by drawing said optical transmission medium obtained by said production method according to claim 1.

* * * * *